June 25, 1940.  R. E. BITGOOD  2,205,712
VEHICLE FUEL TANK CAP LOCK
Filed March 14, 1938
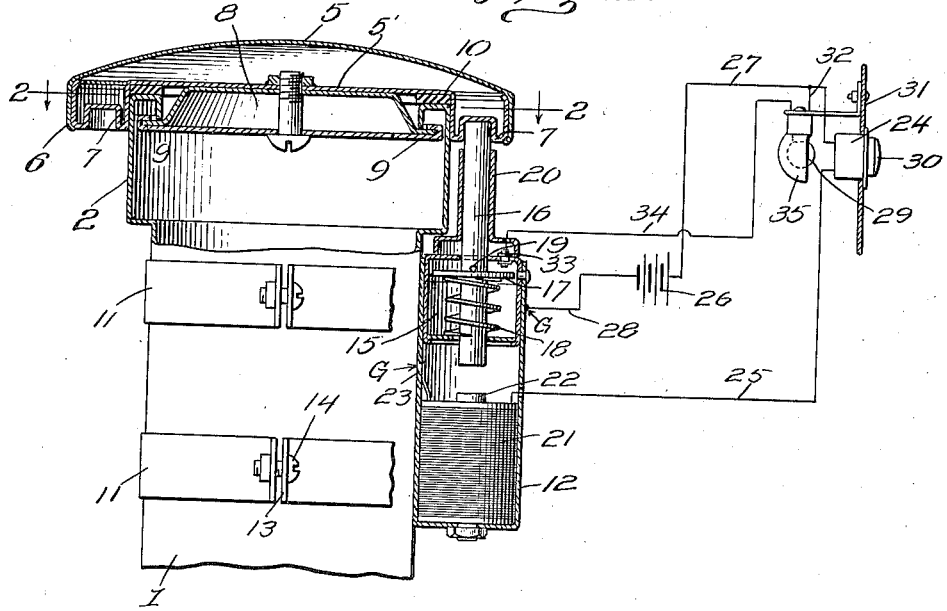
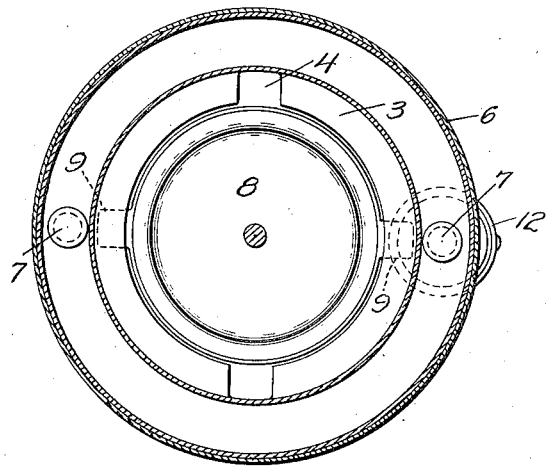
Robert E. Bitgood,
INVENTOR
BY Victor J. Evans & Co.
ATTORNEYS Patented June 25, 1940

2,205,712

UNITED STATES PATENT OFFICE 2,205,712

VEHICLE FUEL TANK CAP LOCK

Robert E. Bitgood, Hope Valley, R. I.

Application March 14, 1938, Serial No. 195,918

1 Claim. (Cl. 292—144)

This invention relates to vehicle fuel tank cap locks, and its general object is to provide an automatic locking device for motor vehicle fuel tank caps, that is electrically operated and switch controlled from the driver's seat of the vehicle, for releasing the cap from a normally locked position to enable removal thereof, particularly by an attendant when it is desired to replenish the fuel supply, therefore it will be seen that unauthorized removal of the cap and theft of the fuel is prevented.

A further object is to provide a vehicle fuel tank cap, automatic locking means therefor and means whereby the cap can be released from the driver's seat of the vehicle, together with means adjacent the driver's seat to indicate when the cap is removed, the indicating means being preferably a light bulb that is illuminated when the cap is removed and extinguished when replaced.

Another object is to provide a fuel tank cap and automatic locking means therefor, that can be readily applied to the filling spouts or necks of tanks now in general use, and in an easy and expeditious manner.

Another object is to provide an apparatus of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view partly in section and illustrates the cap applied and locked in closed position, the major parts of the locking means, its switch and indicating means in elevation, and the circuit therefor is shown diagrammatically.

Figure 2 is a sectional view taken approximately on line 2—2 of Figure 1, looking in the direction of the arrows.

Referring to the drawing in detail, the reference numeral 1 indicates a filling spout or neck of a vehicle fuel tank and which is provided with an enlarged upper portion 2 having an inwardly directed hollow annular flange 3 at the upper end thereof, the flange having diametrically opposed slots 4 therein.

The cap includes an outer body member 5 provided with a substantially dome-shaped upper wall having depending therefrom an annular skirt 6 and associated with the outer member is an inner member 5' which in conjunction with the outer member forms the cap. The inner member includes a flat upper wall having a marginal channel like portion surrounding and depending therefrom and the channel portion is provided with concentrically disposed vertical walls and a bottom wall. The outer vertical wall of the channel portion is engaged with the inner face of the skirt, and the latter is fixed thereto for securing the inner and outer members together. The bottom wall of the channel portion is provided with diametrically opposed recesses or depressions 7, as best shown in Figure 1, to provide keepers for a locking bolt of the locking means which will be later described.

Secured to the underside of the inner member 5' of the cap by a screw bolt in the form as shown, is a hollow disk member 8 having diametrically opposed lugs 9 formed thereon for passage through the slots 4 to engage the lower edge of the flange 3 when the cap is turned for that purpose, so as to secure the cap in closed position, as will be apparent. A gasket 10 provides a leak proof connection between the cap and the flange.

Secured to the filling spout 1 by strap collars 11 is a cylindrical housing 12, the collars 11 being fixed to the housing and the collars are provided with apertured ears 13 for receiving bolt and nut connections 14, therefore it will be seen that the housing can be readily applied and removed with respect to the spout, and mounted in the upper end of the cylinder is a receptacle 15 that has extending through its upper and lower walls for slidable movement a locking bolt 16, to be received in either one of the recesses 7, it depending of course which of the recesses is disposed in the path thereof, as by providing a pair of recesses, the cap can be applied to the spout without attention with respect to the recesses, and either one or the other will be in a position to receive the bolt.

The bolt is spring pressed for normally holding the same in elevated position and within one of the recesses, and for that purpose I provide a disk 17 through which the bolt extends and surrounding the bolt is a coil spring 18 that has its end convolutions engaged with the lower wall of the receptacle and the disk, the latter being provided with an abutment pin 19 which extends transversely through the bolt, as shown in Figure 1. The bolt is guided in its movement by a sleeve 20 which is secured to and rises from the upper wall of the receptacle.

Mounted in the lower portion of the housing 12 and secured accordingly, is an electromagnet 21 for drawing the bolt from the depressions, as will be apparent, due to the fact that the core 22 thereof is arranged in alignment with the lower end of the bolt and in close proximity thereto, and the magnet is grounded as at 23.

Preferably arranged on the instrument board of the vehicle or at any appropriate place in convenient reach of the driver, is a switch 24 of the push button type and one contact element of the switch is electrically connected to the electromagnet 21 by a conductor 25, while the other contact element of the switch is connected to the battery 26 by a conductor 27, the battery being grounded by a conductor 28, consequently it will be seen that when the switch is closed, the circuit to the electromagnet is closed to energize the latter, for drawing the bolt from the recess 7, against the action of the coil spring 18. However, when the button of the switch is released, the circuit will be opened and the bolt will be replaced within the recess.

I also provide indicating means for the purpose of ascertaining when the cap has been removed from the spout, and the indicating means includes a lamp 29 that is preferably disposed directly to the rear of the switch 24, the body of the switch being hollow and the button 30 thereof is translucent, so that the rays of illumination will shine therethrough. The lamp is of course mounted in a socket that is supported by a bracket 31 and one contact of the socket is connected to the conductor 27 by a conductor 32, while the other contact is connected to a switch contact 33, by a conductor 34, the switch contact 33 being arranged in the path of the disk 17, so that when the cap is removed, the disk will engage the switch contact and close the circuit to the lamp, but it will be obvious that when the cap is secured upon the spout, the disk will be moved out of engagement with the switch contact 33 and the circuit to the lamp will be opened. The lamp is preferably provided with a reflector 35.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a locking device for a fuel tank filling neck cap of the type to be turned when applying and removing the same, a cylindrical housing, a receptacle within the housing and including upper and lower walls having registering openings therein, a sleeve secured to and rising from the receptacle, a bolt for engagement with the cap for locking the latter in applied position, said bolt being mounted for slidable movement in the openings for disposal within the housing and through the receptacle and sleeve to be guided thereby, a disk within the receptacle and surrounding the bolt, switch contact means on the upper wall of the receptacle and cooperating with the disk to provide circuit making and breaking means, said contact means being disposed in the path of the disk to be engaged thereby, abutment means for the disk and carried by and positioned on the bolt so that the disk will be held spaced from the contact means when the bolt is engaged by the cap and the latter is in applied position, a coil spring within the receptacle and sleeved about the bolt with its end convolutions engaging the disk and the lower wall of the receptacle respectively for holding the disk in engagement with the contact means when the cap is removed from the neck and for holding the bolt in engagement with the cap when the latter is in applied position, and an electromagnet within the housing for attracting the bolt to move the latter against the action of the spring.

ROBERT E. BITGOOD.